United States Patent
Hedderich et al.

(10) Patent No.: US 10,675,773 B2
(45) Date of Patent: Jun. 9, 2020

(54) BLADE GUARD FOR RAZOR BLADES MADE OF CURABLE ADHESIVE

(71) Applicant: eLED Revolution GmbH, Hochdorf-Assenheim (DE)

(72) Inventors: Philipp Hedderich, Hochdorf-Assenheim (DE); Uwe Orth, Hochdorf-Assenheim (DE)

(73) Assignee: eLED Revolution GmbH, Hochdorf-Assenheim (DE)

( * ) Notice: Subject to any disclaimer, the term of this patent is extended or adjusted under 35 U.S.C. 154(b) by 0 days.

(21) Appl. No.: 15/773,624

(22) PCT Filed: Oct. 26, 2016

(86) PCT No.: PCT/EP2016/075745
§ 371 (c)(1),
(2) Date: May 4, 2018

(87) PCT Pub. No.: WO2017/076709
PCT Pub. Date: May 11, 2017

(65) Prior Publication Data
US 2019/0061188 A1 Feb. 28, 2019

(30) Foreign Application Priority Data
Nov. 5, 2015 (DE) .................... 10 2015 118 959

(51) Int. Cl.
*B26B 21/60* (2006.01)
*B26B 21/40* (2006.01)
*B29C 65/48* (2006.01)
*B29C 65/00* (2006.01)

(52) U.S. Cl.
CPC .......... *B26B 21/60* (2013.01); *B26B 21/4037* (2013.01); *B26B 21/4068* (2013.01); *B29C 65/48* (2013.01); *B29C 66/02245* (2013.01)

(58) Field of Classification Search
CPC . B26B 21/4037; B26B 21/4068; B26B 21/60; B29C 65/48; B29C 66/02245
See application file for complete search history.

(56) References Cited

U.S. PATENT DOCUMENTS 4,208,471 A * 6/1980 Bresak ................ C09D 183/04
428/447
2009/0235529 A1 9/2009 Ringart et al.

FOREIGN PATENT DOCUMENTS

| DE | 1428608 | 11/1968 | |
| DE | 1553758 | 10/1970 | |
| DE | 3049479 | 9/1981 | |
| GB | 1057384 A | * 2/1967 | ............. B05D 7/14 |

OTHER PUBLICATIONS

Written Opinion of the International Searching Authority dated Jan. 2, 2017 in corresponding International Application No. PCT/EP2016/075745 with English-language translation (9 pages).

* cited by examiner

*Primary Examiner* — Frances Tischler
(74) *Attorney, Agent, or Firm* — Meunier Carlin & Curfman LLC

(57) ABSTRACT

The invention relates to the use of a curable adhesive as a blade guard for razor blades of razor systems, wherein the curable adhesive has one or more layers applied over the razor blades and/or the razor blade holder, wherein the outer cutting edges of the razor blades are completely embedded in the adhesive and the curable adhesive is an optically transparent curable adhesive.

15 Claims, No Drawings

BLADE GUARD FOR RAZOR BLADES MADE OF CURABLE ADHESIVE

TECHNICAL FIELD

The present invention relates to the use of a curable adhesive as a blade guard for razor blades of shaving systems.

PRIOR ART

Shaving devices, such as shaving systems for wet shaving, consist of one or more razor blades which are held by a razor blade holder on the razor head. DE 30 49 513 A1 describes a design of such a blade block. The razor blade holder usually comprises a plastics molded part in which the razor blades are received.

To protect the razor blades and prevent injuries, these blades are often protected by a blade guard. The blade guard, for example, comprises a protective cover that is attached onto the razor blade holder. This protects the cutting edges of the razor blades. For use, the cover is removed from the razor blade holder, and the shaving device is therefore ready to be used. After use, the protective cover can be refitted onto the razor blade holder.

DE 1 703 611 A describes a razor blade comprising a razor blade holder made of plastics molded parts, in which a guard element is formed in front of the cutting edge and a cover is formed behind the cutting edge. The razor blade has two sharpened cutting edges, the plastics material applied to each side of the blade being shaped so as to form a guard element for one of the cutting edges and a cap for the other cutting edge, such that the cutting edges are exposed on opposite sides of the head.

DE 1 909 989 A describes a cutting blade which is provided with a durable blade guard. The blade guard consists of a thread, made of any material that is flexible and adapts to the shape of the blade. The thread can be fastened to the blade using an epoxy resin adhesive, for example. It is not intended to completely cover the blade with the adhesive.

EP 1 506 074 B1 describes a shaving system in which the blade is fixedly accommodated in a housing as a razor blade holder. However, a durable blade guard is not provided in this case either. Similar systems are also already described in EP 1 073 545 B1 and EP 1 188 526 B1.

US 2013/0014395 A1 describes a multi-coated razor blade whose coating consists of an adhesive layer, an adhesive coating and a covering layer. If necessary, a further lubricating coating is also provided in order to reduce the friction of the razor blade system. However, a complete embedding of the outer cutting edges in an adhesive, as well as the use of optically transparent adhesive are not intended.

In department stores, test specimens of such razor blades or entire shaving systems are often displayed as samples, in order to give customers an impression of the product. To protect against inadvertent injuries, such test specimens have so far been covered with a protective cover made of plastics material, which is in turn rigidly connected to the razor blade holder. This measure is fairly complex. Furthermore, such a cover makes it hard to recognize the presentation of the razor blade, which is also unsatisfactory.

PRESENTATION OF THE INVENTION

Against this background, it is object of the present invention to provide a blade guard for razor blades of shaving systems that durably embeds the cutting edges of the razor blades completely so that they are suitable for a test system or test sample, without creating a risk of injury for possible test candidates or customers by such a sample.

This object is achieved by the use of an optically transparent curable adhesive as a blade guard for razor blades of shaving systems having the features of claim 1.

According to the invention, a cured adhesive is used as a blade guard for razor blades of shaving systems, which adhesive is applied in single or multiple layers to the razor blades and/or the razor blade holder. The adhesive is intended to be applied over the entire surface of the cutting edges and/or the razor blade holder. The razor blade holder is preferably a plastics molded part in which one or more razor blades are received. As a first method step, the adhesive is preferably applied, in the longitudinal extent, to the cutting edges of the razor blades. It can be applied in one or more layers. In a preferred variant, the gaps between the individual razor blades or the gaps between the cutting edges are first filled with the adhesive. As a further step, the surface is then finished, for example by glazing. The cutting edges of the razor blades are completely embedded in the adhesive. The adhesive is an optically transparent, curable adhesive which, as much as possible, does not impair the viewer's optical perception of the razor blades.

Compared to a conventional protective cover, a curable adhesive has the advantage that it can be applied a high adhesive effect. Furthermore, the razor blades of the razor head that are embedded in the adhesive remain visible to the viewer and, after curing, the adhesive is sufficiently strong to avoid its removal from the razor blades. Thus, the use of a curable adhesive as a blade guard for razor blades combines the aspect of safety by preventing possible cutting injuries on the sharp cutting edges of the blades when handling or assessing a test sample, with the aspect of visual presentation, in that the transparent adhesive material does not optically impair the blades embedded in the adhesive, or does so only to a small extent.

In a preferred variant, the surface can be levelled after the adhesive has been applied, for example, by abrading the adhesive material. This results in a substantially smooth surface and in the blade guard having a transparent optical effect.

In a preferred variant, the razor blades are blunted before the curable adhesive is applied. The blades can be blunted by abrading the blade surface, for example. As a result of this measure, the surface area of the cutting surfaces increases and the surface structure becomes rougher. This can result in a higher adhesive strength between the adhesive and the blade surface, which leads to the adhesive having stronger adhesive effect. Furthermore, this abrading offers the additional benefit that, if the blade guard is inadvertently removed, for example if the test system is improperly demonstrated, the test person is still given some kind of protection from injuries.

The curable adhesive is preferably a polymerization adhesive, a polycondensation adhesive and/or a polyaddition adhesive. The cured adhesive preferably achieves a strength which cannot readily be removed from the razor blade holder or the razor blades.

Preferred curable polymerization adhesives are, for example, methyl acrylate adhesives, anaerobically curable adhesives, unsaturated polyesters or radiation-curable adhesives.

In addition, hot-melt adhesives or water-based adhesives can also be used, provided they have the required degree of curing. Preferred polycondensation adhesives are, for example, phenylformaldehyde resin adhesives, silicone adhesives, silane crosslinking polymer adhesives, polyamide adhesives or polysulfite adhesives. Preferred polyaddition adhesives are, for example, epoxy resin adhesives, polyurethane adhesives or silicones. In addition, the present invention also comprises synthetic resins or natural resins as the curable adhesive. These include, for example, phenoplasts such as PF resins or phenol formaldehyde resins. Furthermore, aminoplasts such as urea formaldehyde, melamine formaldehyde resins or epoxy resins can also be used.

Preferably, the curable adhesive is selected from the group consisting of resin adhesive, synthetic resin, epoxy resin adhesive, hot melt adhesive, UV-curable adhesive, radiation-curable and light-curable adhesive, polyurethane adhesive, silicone adhesive, acrylate adhesive and two-component adhesive. An acrylic glass adhesive is preferably used.

As already mentioned in the introduction, the razor head comprising the razor blades and the razor blade holder is intended to be protected when being assessed within the context of a test sample or a test system. The razor blade is not put into use. Against this background, the curable adhesive can durably remain on the shaving system.

EMBODIMENT OF THE INVENTION AND INDUSTRIAL APPLICABILITY

The present invention is described in greater detail in the following embodiment.

A method for producing a blade guard for razor blades of shaving systems is described, in which an adhesive is applied in single or multiple layers to the razor blades and/or the razor blade holder and subsequently cured. A two-component resin is preferably used for this purpose. The razor blade surface can preferably be blunted, for example by abrading. As a result, the adhesive effect of the adhesive is increased with respect to the razor blade surface, and this measure also prevents a test person from being injured in the event of the blade guard coming loose from the razor blade holder as a result of an external influence. This is recommended, but is by no means imperative, for the method described in the following. As a first step, the adhesive is applied to the surface of the razor blades in order to close the gaps between the razor blades. As a further step, further adhesive is applied in order to optically finish the surface. An even, planar surface is intended. The applied adhesive is preferably left to cure between the two method steps. It is preferably cured by means of a UV treatment, which accelerates the curing process. A further UV treatment then takes place after the final application process. A two-component adhesive which is optically transparent is preferably used as the blade guard. Air-curable adhesives are equally preferable for this purpose as radiation-curable and light-curable adhesives.

The advantage of using a curable adhesive is that it can be applied quickly and efficiently. The cutting edges of the razor blades are therefore efficiently protected by being received in the adhesive mass. At the same time, the visual impression of the razor blades together with the razor blade holder or the razor head is preserved. Finally, the use of a protective cover becomes superfluous, which saves significant material costs. Furthermore, the protective covers have to be durably fastened to the razor head in order to prevent inadvertent removal in test systems. In the future, these measures could be omitted by using a curable adhesive according to the present invention, therefore greatly reducing the costs and effort required for producing a blade guard.

The invention claimed is:

1. A method for producing a blade guard for a shaving system including razor blades and a razor blade holder, comprising:
    applying an adhesive in single or multiple layers to the longitudinal extent of the razor blades and/or the razor blade holder; and
    subsequently curing the adhesive, wherein the external cutting edges of the razor blades are completely embedded in the adhesive, and wherein the adhesive is an optically transparent curable adhesive and therefore have no cutting function, wherein the blade guard durably covers cutting edges of each of the razor blades such that the razor blades are configured for use in a test system or test sample and wherein the razor blades are blunted before the curable adhesive is applied.

2. The method according to claim 1, wherein, as a first step, the razor blades are blunted by abrading before the adhesive is applied.

3. The method according to claim 1 wherein the adhesive is first applied in order to close the gaps between the razor blades and, as a further step, the surface is optically finished.

4. The method according to claim 3, wherein the adhesive is cured after applying the adhesive and before optically finishing the surface.

5. The method according to claim 1, wherein the adhesive is a two-component resin.

6. The method according to claim 1, wherein the surface of the blade guard is levelled.

7. A blade guard for a shaving system including razor blades and a razor blade holder, the blade guard comprising a curable adhesive, the curable adhesive being applied in single or multiple layers to the razor blades and/or the razor blade holder and the blade guard durably covering cutting edges of the razor blades such that the razor blades are configured for use in a test system or test sample, wherein the cutting edges of the razor blades are completely embedded in the curable adhesive and therefore having no cutting function, wherein the curable adhesive is an optically transparent curable adhesive and wherein the razor blades are blunted and the curable adhesive is applied to the blunted razor blades.

8. The blade guard according to claim 7, wherein the curable adhesive is selected from the group consisting of resin adhesive, synthetic resin, epoxy resin adhesive, hot-melt adhesive, UV-curable adhesive, radiation-curable and light-curable adhesive, polyurethane adhesive, silicone adhesive, acrylate adhesive, or two-component adhesive.

9. The blade guard according to claim 7, wherein the curable adhesive is an acrylic glass adhesive.

10. The blade guard according to claim 7, wherein the razor blades are blunted by abrading.

11. The method according to claim 2, wherein the adhesive is first applied in order to close the gaps between the razor blades and, as a further step, the surface is optically finished.

12. The method according to claim 2, wherein the adhesive is a two-component resin.

13. The method according to claim 3, wherein the adhesive is a two-component resin.

14. The method according to claim 4, wherein the adhesive is a two-component resin.

15. The blade guard according to claim 7, wherein the razor blades are blunted in a way that a test person cannot injure themselves on the razor blades in the event of the blade guard coming loose from the razor blades and/or the razor blade holder.

<p style="text-align:center">* * * * *</p>